United States Patent
Karne et al.

(10) Patent No.: US 12,465,565 B2
(45) Date of Patent: Nov. 11, 2025

(54) PHARMACEUTICAL COMPOSITIONS OF RALTEGRAVIR

(71) Applicant: Lupin Limited, Mumbai (IN)

(72) Inventors: Vikram K. Karne, Pune (IN); Avinash K. Velhal, Pune (IN); Sanjay C. Wagh, Pune (IN); Makarand K. Avachat, Pune (IN)

(73) Assignee: Lupin Limited, Mumbai (IN)

( * ) Notice: Subject to any disclaimer, the term of this patent is extended or adjusted under 35 U.S.C. 154(b) by 711 days.

(21) Appl. No.: 17/795,005

(22) PCT Filed: Jan. 22, 2021

(86) PCT No.: PCT/IB2021/050481
§ 371 (c)(1),
(2) Date: Jul. 25, 2022

(87) PCT Pub. No.: WO2021/148992
PCT Pub. Date: Jul. 29, 2021

(65) Prior Publication Data
US 2023/0073216 A1      Mar. 9, 2023

(30) Foreign Application Priority Data
Jan. 23, 2020   (IN) ............................. 202021003085

(51) Int. Cl.
*A61K 9/00* (2006.01)
*A61K 9/20* (2006.01)
*A61K 31/513* (2006.01)

(52) U.S. Cl.
CPC .......... *A61K 9/0053* (2013.01); *A61K 9/2013* (2013.01); *A61K 9/2027* (2013.01); *A61K 9/2054* (2013.01); *A61K 31/513* (2013.01)

(58) Field of Classification Search
CPC .. A61K 9/0053; A61K 9/2013; A61K 9/2027; A61K 9/2054; A61K 31/513
See application file for complete search history.

(56) References Cited

U.S. PATENT DOCUMENTS

| | | | |
|---|---|---|---|
| 7,169,780 B2 | 1/2007 | Crescenzi et al. | |
| 7,754,731 B2 | 7/2010 | Belyk et al. | |
| 2008/0118559 A1 | 5/2008 | Cruanes et al. | |
| 2013/0123741 A1* | 5/2013 | Bolduc | A61P 31/00 604/416 |
| 2013/0203759 A1* | 8/2013 | Nikfar | A61K 31/4418 514/236.8 |
| 2014/0242178 A1 | 8/2014 | Thompson | |

FOREIGN PATENT DOCUMENTS

| | | | | |
|---|---|---|---|---|
| EP | 2529741 A1 | 12/2012 | | |
| WO | WO-2009002821 A2 * | 12/2008 | ........... | A61K 31/427 |
| WO | 2014/186581 A1 | 11/2014 | | |

OTHER PUBLICATIONS

Moss, D. M. et al. A multisystem investigation of raltegravir association with intestinal tissue: implications for pre-exposure prophylaxis and eradication. J Antimicrob Chemother 2014, 69, 3275-3281. (Year: 2014).*
Taniguchi, C. et al. Microenvironmental pH-modification to improve dissolution behavior and oral absorption for drugs with pH-dependent solubility. Expert Opinion on Drug Delivery 2014, 11, 505-516. (Year: 2014).*
PCT Search Report & Written Opinion Dated Apr. 30, 2021, Application No. PCT/IB2021/050481.
"Patient Information Isentress", Merck, Sharp & Dohme Corp., Dec. 2013, XP055140315, Retrieved from the Internet: URL:http://www.merck.com/product/usa/pi_circulars/i/isentress/osentress_ppi.pdf [retrieved on Sep. 15, 2014] p. 5.

* cited by examiner

*Primary Examiner* — Jeffrey H Murray
*Assistant Examiner* — Kristen W Romero
(74) *Attorney, Agent, or Firm* — The Dobrusin Law Firm, P.C.

(57) ABSTRACT

A solid pharmaceutical composition for oral administration comprising raltegravir or a pharmaceutical acceptable salt thereof, an acidifying agent selected from tartaric acid, citric acid, and fumaric acid, and one or more pharmaceutically acceptable excipients.

4 Claims, 1 Drawing Sheet

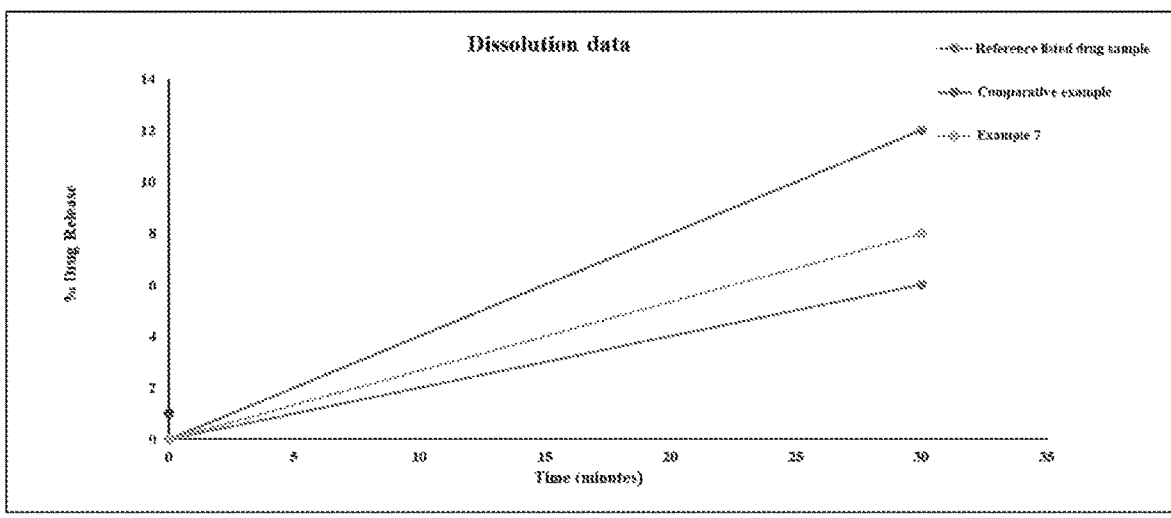

PHARMACEUTICAL COMPOSITIONS OF RALTEGRAVIR

FIELD OF INVENTION

The invention relates to a solid pharmaceutical composition of raltegravir or its pharmaceutical acceptable salts. More particularly, the invention relates to a solid pharmaceutical composition suitable for oral administration comprising raltegravir or its pharmaceutical acceptable salts and pH modifying agent.

BACKGROUND OF THE INVENTION

Human immunodeficiency virus infection and acquired immune deficiency syndrome (HIV/AIDS) is a spectrum of conditions caused by infection with the human immunodeficiency virus (HIV). Treatment consists of highly active antiretroviral therapy (HAART) which slows progression of the disease. Treatment also includes preventive and active treatment of opportunistic infections.

Retroviral integrase is an enzyme produced by a retrovirus (such as HIV) that integrates forms covalent links between its DNA (genetic information) into that of the host cell it infects. The main function of retroviral integrase is to insert the viral DNA into the host chromosomal DNA, that is essential for HIV replication. Integrase inhibitors are a class of antiretroviral drug designed to block the action of integrase, a viral enzyme that inserts the viral genome into the DNA of the host cell.

Raltegravir was the first integrase inhibitor to receive approval in the United States.

Raltegravir is commercially available as a prescription medicine from Merck, under the trade name ISENTRESS® approved in 2007 in the form of 400 milligram (mg) oral tablets and ISENTRESS HD® (Raltegravir Potassium) approved in 2017 in the form of 600 milligram (mg) oral tablets for the treatment of HIV infections.

Raltegravir was initially approved only for use in individuals whose infection has proven resistant to other HAART drugs. However, in July 2009, the FDA granted expanded approval for raltegravir for use in all patients. As with any HAART medication, raltegravir is unlikely to show durability if used as monotherapy, due to the highly mutagenic nature of HIV.

Raltegravir is a carboxamide derivative with chemical name N-(4-fluorobenzyl)-5-hydroxy-1-methyl-2-(1-methyl-1-{[(5-methyl-1,3,4-oxadiazol-2-yl)carbonyl]amino}ethyl)-6-oxo-1,6-dihydropyrimidine-4-carboxamide represented by formula I.

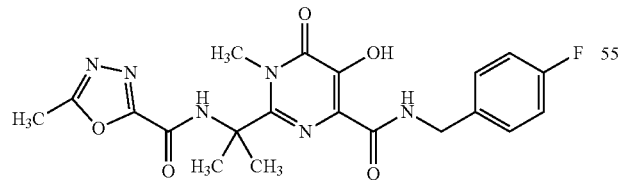

U.S. Pat. No. 7,169,780 discloses a genus of hydroxypyrimidinone carboxamides, which includes raltegravir and its pharmaceutically acceptable salts.

U.S. Pat. No. 7,754,731 claims anhydrous crystalline potassium salt of raltegravir (Form 1). Further it discloses form 2 and form 3 in embodiments.

U.S. Application Publication No. 20080118559 discloses pharmaceutical formulations for oral administration in solid dosage forms that contain an alkali metal salt of raltegravir and an anti-nucleating agent.

Though compositions of raltegravir have been disclosed in the art, there still exists a need to develop an alternative composition of raltegravir that exhibits either equivalent or modified properties.

The inventors of the present invention found that the addition of pH modifying agents modulates physicochemical and pharmacokinetic properties of the formulation.

SUMMARY

The invention is directed to a solid pharmaceutical composition suitable for oral administration comprising raltegravir or its pharmaceutical acceptable salts and pH modifying agent.

In one aspect, the present invention provides a solid pharmaceutical composition for oral administration comprising raltegravir or its pharmaceutically acceptable salts, pH modifying agent and one or more pharmaceutically acceptable excipients.

In another aspect, the present invention provides a solid pharmaceutical composition for oral administration comprising raltegravir or its pharmaceutically acceptable salts, pH modifying agent which includes acidifying agents and one or more pharmaceutically acceptable excipients.

In a further aspect, the present invention provides a solid pharmaceutical composition for oral administration comprising raltegravir or its pharmaceutically acceptable salts, pH modifying agent which comprises acidifying agents and one or more pharmaceutically acceptable excipients selected from superdisintegrant, filler, binders, lubricants and glidants.

In another aspect, the invention relates to a solid pharmaceutical composition for oral administration comprising:
 (i) raltegravir or its pharmaceutically acceptable salts,
 (ii) an acidifying agent,
 (iii) superdisintegrant,
 (iv) binder,
 (v) filler, and
 (vi) lubricant.

In a further aspect, the present invention relates to a solid pharmaceutical composition for oral administration comprising intragranular and extragranular component, wherein an intragranular component and extragranular component comprises one or more selected from:
 (i) raltegravir or its pharmaceutically acceptable salts,
 (ii) an acidifying agent,
 (iii) superdisintegrant,
 (iv) binder,
 (v) filler, and
 (vi) lubricant.

In another aspect, the present invention relates to a solid pharmaceutical composition for oral administration comprising:
 (i) raltegravir or its pharmaceutically acceptable salts,
 (ii) acidifying agent selected from tartaric acid, citric acid and fumaric acid.
 (iii) croscarmellose Sodium,
 (iv) povidone,
 (v) microcrystalline cellulose, and
 (vi) magnesium stearate.

In another aspect, the present invention relates to a solid pharmaceutical composition in the form of tablet for oral administration comprising:

(i) raltegravir or its pharmaceutically acceptable salts,
(ii) acidifying agent selected from tartaric acid, citric acid and fumaric acid.
(iii) croscarmellose Sodium,
(iv) povidone,
(v) microcrystalline cellulose, and
(vi) magnesium stearate.

BRIEF DESCRIPTION OF DRAWINGS

FIG. 1: Comparative dissolution data for example 7, comparative example and reference listed drug sample.

DETAILED DESCRIPTION OF THE INVENTION

The present invention relates to a solid pharmaceutical composition of raltegravir or its pharmaceutical acceptable salts, pH modifying agent and one or more pharmaceutically acceptable excipients.

Raltegravir has poor aqueous solubility, exhibit poor absorption in the gastrointestinal tract. The solubility of such drugs can often be improved by administering the drugs in the form of salts. Some drug salts have relatively high solubility under certain pH conditions but convert to less soluble forms when the pH changes.

The inventors of the present invention found that the addition of pH modifying agents modulates the microenvironmental pH of the formulation which modifies the physicochemical and pharmacokinetic properties of the formulation.

Raltegravir is available in many polymorphic forms which exist in different crystalline phases that differ in arrangement of the molecules in crystallattice. Although polymorphs have the same chemical composition, they differ in packing and geometrical arrangement and exhibit different physical properties such as melting point, density, stability, and solubility. Extensive study is carried out in pharmaceutical industry for development of different polymorphs of various drug substances, to obtain suitable polymorph that possess improved performance characteristics such as aqueous solubility, improved bioavailability, chemical stability, shelf life etc.

The solid pharmaceutical composition of the present invention comprising Raltegravir or its pharmaceutically acceptable salts, wherein Raltegravir or its pharmaceutically acceptable salts can be used in the polymorphic form of, but not limited to Form 1, 2, 3, IV, V, VI, VII, VIII, IX, X, XI, XII, XIII, XIV, XV, XVI.

As used herein 'microenvironmental pH' refers to the pH of the solution in the immediate vicinity of the drug particles. It can also be referred as surface pH.

A 'solid' pharmaceutical composition for oral administration means a pharmaceutical composition which is orally administered in any convenient solid form including, but not limited to powders, granules, pills, powder-filled capsules, granule-filled capsules, and tablets.

The term 'pharmaceutically acceptable salt' refers to a salt which is effective and not undesirable (e.g., is neither toxic nor otherwise deleterious to the recipient thereof). Suitable salts of raltegravir include base salts; i.e., salts formed by reaction of the drug compound with a base.

The raltegravir salt is an alkali metal salt such as a sodium or potassium salt, and is more typically a potassium salt. The solid pharmaceutical composition of the present invention comprises raltegravir potassium may be in the form of Form 1, Form 2 or Form 3.

The solid pharmaceutical composition of the present invention may comprise raltegravir or its pharmaceutically acceptable salts in the range of about 25% w/w to about 95% w/w, preferably about 30% w/w to about 90% w/w, more preferably about 50% w/w to about 85% w/w by weight of the total composition.

The 'pH modifying agent' refers to the agent which helps to control or adjust the pH. Suitable pH modifying agent includes acidifying agent and/or buffering agent. The acidifying agent and/or buffering agent can be employed in the pharmaceutical composition in intra granular component, extragranular component or both.

The term 'acidifying agent' as used herein throughout the specification refers to the substances which imparts acidic environment or micro-environment to the drug in composition as well as during its dissolution and absorption. Suitable acidifying agents includes, but not limited to citric acid, tartaric acid, fumaric acid, formic acid, malic acid, oxalic acid, lactic acid and/or combinations thereof. The preferred acidifying agent is tartaric acid. The composition of the present invention may comprise acidifying agent in the range of about 0.5% w/w to about 30% w/w, preferably about 0.5% w/w to about 20% w/w, more preferably about 0.5% w/w to about 10% w/w by weight of the total composition.

The term 'buffering agent' as used herein is a weak acid or base used to maintain the acidity (pH) of a solution near a chosen value. Suitable buffering agents includes glycerol buffers, citrate buffers, borate buffers, phosphate buffers, citric acid-phosphate buffers and/or combinations thereof. The composition of the present invention may comprise buffering agent in the range of about 0.5% w/w to about 20% w/w, preferably about 0.5% w/w to about 15% w/w, more preferably about 0.5% w/w to about 5% w/w by weight of the total composition.

The term 'pharmaceutically acceptable excipients' refers to one or more non-active pharmaceutical ingredient substances such as superdisintegrant, binders, fillers and lubricants.

The term 'superdisintegrant' as used herein refers to substances, which facilitate the faster disintegration with smaller quantity. They are used as a structural weakener for the disintegrable solid dosage forms which are physically dispersed within the matrix of the dosage form and will expand when the dosage form is exposed to the wet and are more effective at lower concentrations with greater disintegrating efficiency and mechanical strength. The superdisintegrant can be employed in the pharmaceutical composition either in intra granular component or extragranular component or both. It can be optionally a combination of two or more superdisintegrants. Suitable superdisintegrants includes, but not limited to crospovidone, croscarmellose sodium, sodium starch glycolate and/or combinations thereof. The preferred superdisintegrant is croscarmellose sodium. The composition of the present invention may comprise superdisintegrant either in intra granular component or extragranular component or both in the range of about 1% w/w to about 30% w/w, preferably about 1% w/w to about 25% w/w, more preferably about 1% w/w to about 20% w/w by weight of the total composition.

The term 'filler' as used herein refers to a substance that helps in bulking up solid formulations that contain potent active ingredients in small amounts. Suitable fillers includes, but not limited to lactose anhydrous or lactose monohydrate, hypromellose, carbomer, low moisture microcrystalline cellulose, colloidal silicon dioxide, dextrates (anhydrous), dextrose (anhydrous), maltol, fructose, guar gum, lactitol (anhydrous), magnesium carbonate, maltitol, maltose, mannitol, polyethylene oxide, sorbitol, sucrose, compressible sugar, confectioner's sugar, xylitol and/or combinations thereof. The preferred filler is microcrystalline cellulose. The composition of the present invention may comprise filler in the range of about 1% w/w to about 35% w/w, preferably about 5% w/w to about 25% w/w, more preferably about 5% w/w to about 15% w/w by weight of the total composition.

The term 'binder' as used herein refers to a substance or mixture of substance that imparts cohesiveness and hold the ingredients in a tablet together. Suitable binders includes, but not limited to, gelatin, cellulose, cellulose derivatives such as methyl cellulose, microcrystalline cellulose and cellulose ethers such as hydroxypropyl cellulose (HPC), polyvinylpyrrolidone (povidone), starch, sucrose, polyethylene glycol and/or combinations thereof. The preferred binder is polyvinylpyrrolidone. The composition of the present invention may comprise binder in the range of about 1% w/w to about 50% w/w, preferably about 1% w/w to about 25% w/w, more preferably about 1% w/w to about 10% w/w by weight of the total composition.

The term 'lubricant' as used herein refers to a substance that improve flow of granules resulting from granulation step and prevent ingredients from clumping together and from sticking to the tablet punches or capsule filling machine. Suitable lubricants includes, but not limited to magnesium, aluminum, calcium or zinc stearate, polyethylene glycol, polyvinyl alcohol, potassium benzoate, sodium benzoate, sodium stearyl fumarate, talc, stearyl alcohol, leucine, ethylene oxide polymers, poloxamer, octyldodecanol, sodium stearyl fumarate and sodium lauryl sulfate and/or combinations thereof. The preferred lubricant is magnesium stearate. The composition of the invention preferably comprise lubricant in range from about 0.1% w/w to about 10% w/w, preferably about 0.1% w/w to about 5% w/w, more preferably about 0.1% w/w to about 2.0% w/w by weight of the total composition.

The solid pharmaceutical composition may be developed in a dosage form suitable for oral administration, including but not limited to tablet, capsule, granules, pellets, beads, mini-tablets or capsule filled with granules, pellets or mini-tablets.

In another embodiment the present invention is directed to a solid pharmaceutical composition for oral administration comprising:
(i) raltegravir or its pharmaceutically acceptable salts,
(ii) an acidifying agent,
(iii) superdisintegrant,
(iv) binder,
(v) filler, and
(vi) lubricant.

In a further aspect, the present invention relates to a solid pharmaceutical composition for oral administration comprising intragranular and extragranular component, wherein an intragranular component and extragranular component comprises one or more selected from:
(i) raltegravir or its pharmaceutically acceptable salts,
(ii) an acidifying agent,
(iii) superdisintegrant,
(iv) binder,
(v) filler, and
(vi) lubricant.

In another aspect, the present invention relates to a solid pharmaceutical composition for oral administration, comprising:
(i) raltegravir or its pharmaceutically acceptable salts,
(ii) an acidifying agent selected from tartaric acid, citric acid and fumaric acid.
(iii) croscarmellose Sodium,
(iv) povidone,
(v) microcrystalline cellulose, and
(vi) magnesium stearate.

In another aspect, the present invention relates to a solid pharmaceutical composition for oral administration comprising intragranular and extragranular component, wherein an intragranular component and extragranular component comprises one or more selected from:
(i) raltegravir or its pharmaceutically acceptable salts,
(ii) an acidifying agent selected from tartaric acid, citric acid and fumaric acid.
(iii) croscarmellose Sodium,
(iv) povidone,
(v) microcrystalline cellulose, and
(vi) magnesium stearate.

In another aspect, the present invention relates to a solid pharmaceutical composition for oral administration comprising intragranular and extragranular component, wherein an intragranular component and extragranular component comprises one or more selected from:
(i) raltegravir potassium Form 1,
(ii) an acidifying agent selected from tartaric acid, citric acid and fumaric acid.
(iii) croscarmellose Sodium,
(iv) povidone,
(v) microcrystalline cellulose, and
(vi) magnesium stearate.

In another aspect, the present invention relates to a solid pharmaceutical composition for oral administration comprising intragranular and extragranular component, wherein an intragranular component and extragranular component comprises one or more selected from:
(i) raltegravir potassium Form 2,
(ii) an acidifying agent selected from tartaric acid, citric acid and fumaric acid.
(iii) croscarmellose Sodium,
(iv) povidone,
(v) microcrystalline cellulose, and
(vi) magnesium stearate.

In another aspect, the present invention relates to a solid pharmaceutical composition for oral administration comprising intragranular and extragranular component, wherein an intragranular component and extragranular component comprises one or more selected from:
(i) raltegravir potassium Form 3,
(ii) an acidifying agent selected from tartaric acid, citric acid and fumaric acid.
(iii) croscarmellose Sodium,
(iv) povidone,
(v) microcrystalline cellulose, and
(vi) magnesium stearate.

In an embodiment of the present invention the solid pharmaceutical composition may comprise from about 1% w/w to about 35% w/w of fillers or diluents, about 1% w/w to about 50% w/w of binder, about 1% w/w to about 25% w/w of superdisintegrants, about 0.5% w/w to about 10% w/w of pH modifying agents, and about 0.1% w/w to about 10% w/w of lubricants based on total weight of the composition, wherein the weight percent of each ingredient is based on the total weight of the compressed tablet.

In further embodiment of the present invention the solid pharmaceutical composition may comprise from about 1% w/w to about 30% w/w of fillers or diluents, about 1% w/w to about 50% w/w of binder, about 5% w/w to about 25% w/w of superdisintegrants, about 1% w/w to about 10% w/w of pH modifying agents, and about 0.1% w/w to about 10% w/w of lubricants based on total weight of the composition, wherein the weight percent of each ingredient is based on the total weight of the compressed tablet.

In yet another embodiment of the present invention the solid pharmaceutical composition may comprise from about 1% to about 35% w/w of fillers or diluents, about 1% to about 50% w/w of binder, about 1% to about 20% w/w of superdisintegrants, about 0.5% to about 10% w/w of acidifying agents, and about 0.1% to about 10% w/w of lubricants based on total weight of the composition, wherein the weight percent of each ingredient is based on the total weight of the compressed tablet.

In another aspect, the present invention relates to a solid pharmaceutical composition for oral administration, comprising:
  (i) raltegravir or its pharmaceutically acceptable salts,
  (ii) about 0.5% w/w to about 10% w/w of an acidifying agent selected from tartaric acid, citric acid and fumaric acid.
  (iii) about 1% w/w to about 25% w/w croscarmellose Sodium,
  (iv) about 1% w/w to about 25% w/w povidone,
  (v) about 1% w/w to about 35% w/w microcrystalline cellulose, and
  (vi) about 0.1% w/w to about 5% w/w magnesium stearate
  wherein the weight percent of each ingredient is based on the total weight of the composition.

In another aspect, the present invention relates to a solid pharmaceutical composition for oral administration comprising intragranular and extragranular component, wherein an intragranular component and extragranular component comprises one or more selected from:
  (i) about 1% w/w to about 80% w/w of raltegravir or its pharmaceutically acceptable salts,
  (ii) about 0.5% w/w to about 10% w/w of an acidifying agent selected from tartaric acid, citric acid and fumaric acid.
  (iii) about 1% w/w to about 25% w/w croscarmellose Sodium,
  (iv) about 1% w/w to about 25% w/w povidone,
  (v) about 1% w/w to about 35% w/w microcrystalline cellulose, and
  (vi) about 0.1% w/w to about 5% w/w magnesium stearate
  wherein the weight percent of each ingredient is based on the total weight of the composition.

In another aspect, the present invention relates to a pharmaceutical tablet for oral administration comprising intragranular and extragranular component, wherein an intragranular component and extragranular component comprises one or more selected from:
  (i) about 1% w/w to about 80% w/w of raltegravir or its pharmaceutically acceptable salts,
  (ii) about 0.5% w/w to about 10% w/w of an acidifying agent selected from tartaric acid, citric acid and fumaric acid.
  (iii) about 1% w/w to about 25% w/w croscarmellose Sodium,
  (iv) about 1% w/w to about 25% w/w povidone,
  (v) about 1% w/w to about 35% w/w microcrystalline cellulose, and
  (vi) about 0.1% w/w to about 5% w/w magnesium stearate
  wherein the weight percent of each ingredient is based on the total weight of the compressed tablet.

In another aspect, the present invention relates to a solid pharmaceutical composition for oral administration comprising intragranular and extragranular component, wherein an intragranular component and extragranular component comprises one or more selected from:
  (i) about 1% w/w to about 80% w/w of raltegravir potassium Form 1,
  (ii) about 0.5% w/w to about 10% w/w of an acidifying agent selected from tartaric acid, citric acid and fumaric acid.
  (iii) about 1% w/w to about 25% w/w croscarmellose Sodium,
  (iv) about 1% w/w to about 25% w/w povidone,
  (v) about 1% w/w to about 35% w/w microcrystalline cellulose, and
  (vi) about 0.1% w/w to about 5% w/w magnesium stearate
  wherein the weight percent of each ingredient is based on the total weight of the composition.

In another aspect, the present invention relates to a solid pharmaceutical composition for oral administration comprising intragranular and extragranular component, wherein an intragranular component and extragranular component comprises one or more selected from:
  (i) about 1% w/w to about 80% w/w of raltegravir potassium Form 2,
  (ii) about 0.5% w/w to about 10% w/w of an acidifying agent selected from tartaric acid, citric acid and fumaric acid.
  (iii) about 1% w/w to about 25% w/w croscarmellose Sodium,
  (iv) about 1% w/w to about 25% w/w povidone,
  (v) about 1% w/w to about 35% w/w microcrystalline cellulose, and
  (vi) about 0.1% w/w to about 5% w/w magnesium stearate
  wherein the weight percent of each ingredient is based on the total weight of the composition.

In another aspect, the present invention relates to a solid pharmaceutical composition for oral administration comprising intragranular and extragranular component, wherein an intragranular component and extragranular component comprises one or more selected from:
  (i) about 1% w/w to about 80% w/w of raltegravir potassium Form 3,
  (ii) about 0.5% w/w to about 10% w/w of an acidifying agent selected from tartaric acid, citric acid and fumaric acid.
  (iii) about 1% w/w to about 25% w/w croscarmellose Sodium,
  (iv) about 1% w/w to about 25% w/w povidone,
  (v) about 1% w/w to about 35% w/w microcrystalline cellulose, and
  (vi) about 0.1% w/w to about 5% w/w magnesium stearate
  wherein the weight percent of each ingredient is based on the total weight of the composition.

The solid pharmaceutical compositions described in various embodiments of the invention is preferably formed by various methods known in the art. Such manufacturing processes includes, but not limited to slugging or roller compaction, dry granulation, hot melt granulation, direct compression, double compression, layering.

The compressed tablets can be sugar coated to mask any unpleasant taste or film coated to protect the tablet from atmospheric degradation. Suitable film coating suspensions includes but not limited to carboxymethylcellulose sodium, carnauba wax, cellulose acetate phthalate, cetyl alcohol, ethyl cellulose, gelatin, hydroxyethyl cellulose, hydroxypropyl cellulose, hydroxypropyl methylcellulose, liquid glucose, maltodextrin, methyl cellulose, microcrystalline wax, Opadry I and Opadry II, polymethacrylates, polyvinyl alcohol, shellac, sucrose, talc, titanium dioxide, zein and/or combinations thereof.

The solid pharmaceutical compositions of the present invention have modified physicochemical and pharmacokinetic properties. The solid pharmaceutical compositions of the present invention modulates the release of raltegravir to have the same dissolution profile as that of reference listed drug or innovator. The dissolution testing was carried out in USP type II (Paddle) dissolution apparatus with dissolution medium of water 250 mL+0.1 N HCl 50 mL (total volume 300 mL) at the time point of 30 minutes.

The solid composition of the present invention exhibits improved stability. The stability studies are carried out at 40° C. and 75% relative humidity for 6 Months. The amounts of the impurities can be determined by procedures known in the art, e.g., HPLC, NMR, or methods from US Pharmacopeia, or European Pharmacopeia, or a combination of two or more of these methods.

The following examples illustrate the invention and they do not any way limit the scope of the invention. A person skilled in the art would easily modify the process for manufacturing the said pharmaceutical composition or could modify the composition with similar materials and finally a person skilled in the art could modify the method of administering the said composition of this invention.

Example 1: Tablet Composition of Raltegravir

TABLE 1

| Sr. No. | Ingredients | Quantity (% w/w) |
|---|---|---|
| 1 | Raltegravir potassium (equiv to Raltegravir) | 63.3 |
| 2 | Microcrystalline cellulose | 12.0 |
| 3 | Povidone K 30 | 4.2 |
| 4 | Tartaric acid | 2.4 |
| 5 | Croscarmellose sodium | 16.6 |
| 6 | Magnesium stearate | 1.5 |
| | Total weight of tablet | 100.000 |

Raltegravir potassium, microcrystalline cellulose, povidone K 30, tartaric acid and croscarmellose sodium were sifted together and blended. Magnesium stearate was sifted and added to the above blend. The blend was dry granulated to form the desired granules. The lubricated blend was compressed to form tablets.

Example 2: Tablet Composition of Raltegravir

TABLE 2

| Sr. No. | Ingredients | Quantity (% w/w) |
|---|---|---|
| 1 | Raltegravir potassium (equiv to Raltegravir) | 63.0 |
| 2 | Microcrystalline cellulose | 33.8 |
| 3 | Citric acid | 0.7 |

TABLE 2-continued

| Sr. No. | Ingredients | Quantity (% w/w) |
|---|---|---|
| 4 | Croscarmellose sodium | 1.0 |
| 5 | Magnesium stearate | 1.5 |
| | Total weight of tablet | 100.000 |

Raltegravir potassium, microcrystalline cellulose, citric acid and croscarmellose sodium were sifted together and blended. Magnesium stearate was sifted and added to the above blend. The blend was dry granulated to form the desired granules. The lubricated blend was compressed to form tablets.

Example 3: Tablet Composition of Raltegravir

TABLE 3

| Sr. No. | Ingredients | Quantity (% w/w) |
|---|---|---|
| | Intragranular | |
| 1 | Raltegravir potassium (equiv to Raltegravir) | 63.0 |
| 2 | Microcrystalline cellulose | 11.4 |
| 3 | Povidone K 30 | 4.3 |
| 4 | Croscarmellose Sodium | 13.9 |
| 5 | Magnesium stearate | 0.75 |
| | Extragranular | |
| 6 | Tartaric acid | 2.8 |
| 7 | Croscarmellose sodium | 3.1 |
| 8 | Magnesium stearate | 0.75 |
| | Total weight of tablet | 100.000 |

Raltegravir potassium, microcrystalline cellulose, povidone K 30 and croscarmellose sodium (Intragranular) were sifted together and blended. Magnesium stearate (Intragranular) was sifted and added to the above blend. The blend was dry granulated to form the desired granules. Further tartaric acid and croscarmellose Sodium (Extragranular) were sifted together and blended. Magnesium stearate (Extragranular) was sifted and added to the above blend. The extragranular blend was added to the granules and further was compressed to form tablets.

Example 4: Tablet Composition of Raltegravir

TABLE 4

| Sr. No. | Ingredients | Quantity (% w/w) |
|---|---|---|
| | Intragranular | |
| 1 | Raltegravir potassium (equiv to Raltegravir) | 64.0 |
| 2 | Microcrystalline cellulose | 32.0 |
| 3 | Citric acid | 1.4 |
| 4 | Magnesium stearate | 0.7 |

TABLE 4-continued

| Sr. No. | Ingredients | Quantity (% w/w) |
|---|---|---|
| | Extragranular | |
| 5 | Croscarmellose sodium | 1.2 |
| 6 | Magnesium stearate | 0.7 |
| | Total weight of tablet | 100.000 |

Raltegravir potassium, microcrystalline cellulose, citric acid were sifted together and blended. Magnesium stearate (Intragranular) was sifted and added to the above blend. The blend was dry granulated to form the desired granules. Further croscarmellose sodium and magnesium stearate (Extragranular) was sifted and added to the above blend. The extragranular blend was added to the granules and further was compressed to form tablets.

Example 5: Tablet Composition of Raltegravir

TABLE 5

| Sr. No. | Ingredients | Quantity (% w/w) |
|---|---|---|
| 1 | Raltegravir potassium (equiv to Raltegravir) | 63.0 |
| 2 | Microcrystalline cellulose | 13.2 |
| 3 | Povidone K 30 | 4.2 |
| 4 | Fumaric acid powder | 3.1 |
| 5 | Croscarmellose sodium | 15.3 |
| 6 | Magnesium stearate | 1.2 |
| | Total weight of tablet | 100.000 |

Raltegravir potassium, microcrystalline cellulose, povidone K 30, fumaric acid powder and croscarmellose sodium were sifted together and blended. Magnesium stearate was sifted and added to the above blend. The blend was dry granulated to form the desired granules. The lubricated blend was compressed to form tablets.

Example 6: Tablet Composition of Raltegravir

TABLE 6

| Sr. No. | Ingredients | Quantity (% w/w) |
|---|---|---|
| 1 | Raltegravir potassium (Form 3) | 63.2 |
| 2 | Microcrystalline cellulose | 11.2 |
| 3 | Povidone | 4.2 |
| 4 | Tartaric acid | 3.2 |
| 5 | Croscarmellose sodium | 16.6 |
| 6 | Magnesium stearate | 1.6 |
| | Total weight of tablet | 100.000 |

Raltegravir potassium, microcrystalline cellulose, povidone K 30, tartaric acid and croscarmellose sodium were sifted together and blended. Magnesium stearate was sifted and added to the above blend. The blend was dry granulated to form the desired granules. The lubricated blend was compressed to form tablets.

Example 7: Tablet Composition of Raltegravir

TABLE 7

| Sr. No. | Ingredients | Quantity (% w/w) |
|---|---|---|
| 1 | Raltegravir potassium (Form 3) | 63.2 |
| 2 | Microcrystalline cellulose | 10.5 |
| 3 | Povidone | 4.2 |
| 4 | Tartaric acid | 3.9 |
| 5 | Croscarmellose sodium | 16.6 |
| 6 | Magnesium stearate | 1.6 |
| | Total weight of tablet | 100.000 |

Raltegravir potassium, microcrystalline cellulose, povidone K 30, tartaric acid and croscarmellose sodium were sifted together and blended. Magnesium stearate was sifted and added to the above blend. The blend was dry granulated to form the desired granules. The lubricated blend was compressed to form tablets.

The above examples were all prepared with acidifying agents.

Comparative Example: Tablet Composition of Raltegravir without Acidifying Agent

TABLE 8

| Sr. No. | Ingredients | Quantity (% w/w) |
|---|---|---|
| 1 | Raltegravir potassium (Form 3) | 63.2 |
| 2 | Microcrystalline cellulose | 34.3 |
| 3 | Croscarmellose sodium | 1.0 |
| 4 | Magnesium stearate | 1.5 |
| | Total weight of tablet | 100.000 |

Raltegravir potassium, microcrystalline cellulose and croscarmellose sodium were sifted together and blended. Magnesium stearate was sifted and added to the above blend. The blend was dry granulated to form the desired granules. The lubricated blend was compressed to form tablets.

Dissolution study of example 7, comparative example and reference listed drug sample (Isentress HD® lot number R031372) was carried out as follows:
Media: Water 250 mL+0.1 N HCl 50 mL
Apparatus: USP Type II (Paddle)
Volume: 300 mL The results of dissolution study is presented in table 9 below (FIG. 1). The result shows that the acidifying agent modulates the release of raltegravir potassium to match it with reference listed drug.

TABLE 9

| Time | reference listed drug (R031372) | Comparative example 30 min | Example 7 |
|---|---|---|---|
| % Drug release | 6 | 12 | 8 |

Stability study was performed on the example 1 and comparative example. The samples were kept at 40° C. and 75% relative humidity for 6 Months duration at accelerated conditions. The results of stability study is presented in table 10 below. The result shows that the acidifying agent shows decrease in level of any unspecified degradation product and total degradation products.

TABLE 10

| Condition | Comparative example 40° C./75% RH | | Example 1 40° C./75% RH | |
|---|---|---|---|---|
| Duration | Initial | 6 M | Initial | 6 M |
| Any Unspecified Degradation Product | BQL | 0.38 | 0.06 | BQL |
| Total Degradation Products | 0.08 | 0.72 | 0.19 | 0.12 |

*BQL- Below quantification level.

The invention claimed is:

1. A solid pharmaceutical composition for oral administration comprising:
 (i) raltegravir or a pharmaceutically acceptable salt thereof,
 (ii) acidifying agent selected from tartaric acid, citric acid and fumaric acid,
 (iii) croscarmellose sodium,
 (iv) povidone,
 (v) microcrystalline cellulose, and
 (vi) magnesium stearate.

2. The solid pharmaceutical composition of claim 1, wherein the composition comprises from:
 (i) 1% w/w to 80% w/w of raltegravir or a pharmaceutically acceptable salt thereof,
 (ii) 0.5% w/w to 10% w/w of an acidifying agent selected from tartaric acid, citric acid and fumaric acid,
 (iii) 1% w/w to 25% w/w croscarmellose sodium,
 (iv) 1% w/w to 25% w/w povidone,
 (v) 1% w/w to 35% w/w microcrystalline cellulose, and
 (vi) 0.1% w/w to 5% w/w magnesium stearate wherein the weight percent of each ingredient is based on the total weight of the composition.

3. The solid pharmaceutical composition of claim 2, wherein the ingredients are present in an intragranular component, extragranular component and/or both.

4. The solid pharmaceutical composition of claim 1, wherein the raltegravir or a pharmaceutically acceptable salt thereof, is selected from the group consisting of raltegravir potassium Form 2 and Form 3.

* * * * *